June 20, 1944.  W. R. COLLINGS  2,351,600
LAMINATED SOUND RECORD
Filed Sept. 23, 1940

INVENTOR.
William R. Collings
BY
Griswold & Burdick
ATTORNEYS

Patented June 20, 1944

2,351,600

UNITED STATES PATENT OFFICE 2,351,600

LAMINATED SOUND RECORD

William R. Collings, Midland, Mich., assignor to The Dow Chemical Company, Midland, Mich., a corporation of Michigan Application September 23, 1940, Serial No. 357,929

7 Claims. (Cl. 154—43)

This invention relates to a method of making laminated sound records and to a particular surfacing material for such records. The invention has especial reference to the field of flat disc records upon the surfaces of which is impressed a sound track from a master record, or matrix.

Numerous thermoplastic compositions have been proposed for use both in coated records for instantaneous recordings, and in laminated records for die embossing from a master die, commonly referred to in the art as a matrix. Many of the proposed thermoplastic laminae for making such records, if soft enough to stick to the customary fibrous base are too soft to give faithful reproductions of the impressed tone images. Similarly, if the film is hard enough to retain the sound track in accurate reproduction from the matrix, it is too hard to adhere to the base. Two main compromises have been indulged in to overcome these difficulties. One, a compromise between hard and soft compositions, has little to recommend it, as it gives neither good adherence to the base nor accurate and long-lived impressions of the sound track. The other method has involved use of adhesives in an attempt to bond the hard film to the fibrous base. Because of the wide difference in composition between the thermoplastic lamina, the fibrous base, and the customary adhesives, there is no real union of the parts into a single integral whole. It has been common experience that laminated records, especially of the type intended for low price markets, and more particularly when the supporting base bears printed indicia on its surface, are prone to separate, one lamina from the other, with changes of humidity or on long standing, and that they have generally been unsatisfactory. Lacking this failing, a more common and equally as serious drawback of such records is their poor wearing qualities.

It is accordingly an object of the prsent invention to provide laminated sound records and particular surface laminae for use therein. Another object is to provide a surface sheet for laminated sound records which is at the same time possessed of sufficient surface hardness and sufficiently free from elasticity to be employed successful'y in recording sound impressions from a matrix, and also has the ability to be affixed firmly and permanently to paper or other fibrous base by the mere application of moderate heat and pressure. A particular object is to provide a two-sided film for use in making records as aforesaid, one surface of which has the required hardness for receiving and retaining impressions from a master record matrix and the other surface of which is a permanent adhesive which is sensitive to heat and pressure. In view of the high cost of scrap losses resulting from the trimming of records of the type here concerned when more than one plastic is employed, it is yet another object to provide a two-sided surface sheet as aforesaid whereof the two surface compositions contain the same basic ingredient.

It has now been found, according to the present invention, that the foregoing and related objects may be attained, and long-lived records of high fidelity may be produced on a basis permitting retail sales at low cost by utilizing a particular two-sided film whereof both sides contain ethyl cellulose, of substantially the same degree of substitution, as the sole film-forming material. The said two-sided film will be described more fully hereinafter, as will various ways in which it may be used. While, of course, every film has two faces, the term "two-sided film," as employed in the present description and claims, is intended to refer to a unitary film, the two faces of which differ markedly from one another in their physical characteristics, and to this extent such films may also be referred to as bifunctional films.

The method of the invention consists in applying to pasteboard or other suitable base a composite or two-sided film having one heat-resistant ethyl cellulose side and one side of a heat- and pressure-sensitive ethyl cellulose composition, so that the thermally cementitious side of the composite film is against the pasteboard, and pressing the two together by means of a heated sound record die or matrix which is applied to the heat-resistant surface with enough pressure thereon the impressions constituting the sound track, and to cause the thermally cementitious side to stick to the base.

Reference is made to the acccompanying drawing wherein, in the interest of clarity, certain features are shown on a somewhat exaggerated scale.

Figure 1:
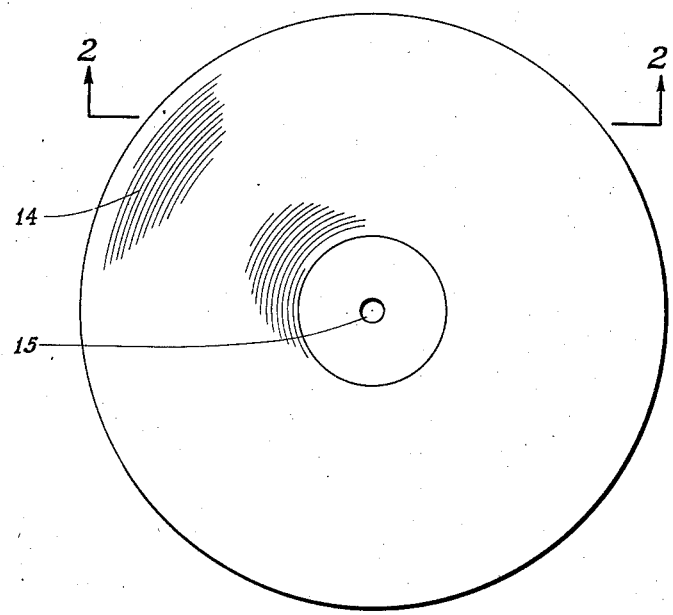
Fig. 1 is a plan view of a disc-type sound record having a supporting base and a laminated surface film bonded thereto.
Figure 2:
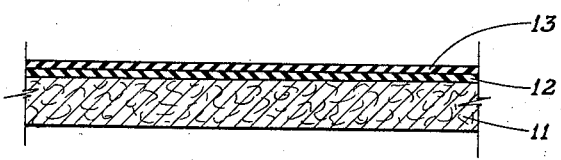
Fig. 2 is a cross-sectional elevation taken along the line 2—2 of Fig. 1.

The sound record of the invention, such as the disc record of Fig. 1, is composed of a supporting base, 11 of Fig. 2, having bonded thereto on at least one side a laminated film consisting of two layers of ethyl cellulose compositions, as hereinafter described, the sound track, a portion of which is shown at 14, being impressed in the outer layer. The hole 15 in the center of the record is adapted to fit over the center post of the turntable of a conventional reproducing machine. The construction of the record is shown clearly in the cross-sectional view of Fig. 2. The hard outer surface 13 of the laminated film is thoroughly bonded to the supporting base 11 by the thermally cementitious layer 12. The natures of the layers 12 and 13 are, as is hereinafter explained, such that when the laminated film is pressed firmly into contact with the base 11 by a heated matrix, the inner layer 12 of the film becomes soft and cementitious and bonds the film to the base 11 while the outer layer 13 of the film, being harder and having a higher softening point than the inner layer 12, does not become soft and cementitious. The outer layer 13 is, however, of such nature that the heated matrix impresses thereon an accurate reproduction of the sound track.

The two-sided film of the invention consists of a surface layer of ethyl cellulose containing in no case more than about 20 per cent of a plasticizer therefor, and a second surface layer of (preferably) the same type of ethyl cellulose in a composition whereof the non-volatile components are essentially

| | Per cent |
|---|---|
| Ethyl cellulose | 85-40 |
| Plasticizer | 15-60 |

The latter layer is the thermally cementitious layer and the former is the heat-resistant layer previously mentioned. In no case does the heat-resistant layer contain as much plasticizer as the cementitious layer. In preparing the composite films, a viscous solution of one of the ethyl cellulose compositions is deposited by extrusion on a moving belt and, while it is still moist with solvent, a similarly viscous solution of the other ethyl cellulose composition is extruded and spread thereover. On drying to remove solvents, the two layers are found to have blended together at their interface so that they cannot be separated from one another. They do not merge to such an extent as to form a single composition throughout, however, and the respective surfaces of the two-sided films retain the characteristics of the compositions from which they were cast. When the compositions employed are within the preferred limits of proportion, one exposed surface of the composite film will have a softening point at least 50 Fahrenheit degrees higher than that of the other surface.

Within the previously recited range of compositions may be found specifically narrower ranges which are preferred for each of two principal ethoxy grades of ethyl cellulose. Thus, when using "standard" ethyl cellulose, of 47.5 to 49 per cent ethoxy content, the composition of the hard side of the two-sided film should preferably contain no more than 10 per cent plasticizer, while the soft, thermally cementitious side will contain from 15 to 50 per cent, and preferably from 15 to 30 per cent of plasticizer, more or less, depending on the pressure to be used in the bonding operation. Similarly, if "medium ethoxy" type of ethyl cellulose, i. e. one of from 43 to 47 per cent ethoxy, is to be employed, the hard side may contain up to about 20 per cent of plasticizer, and the soft side will contain from 35 to 60 per cent, and preferably from about 45 to 55 per cent of plasticizer.

Regardless of the type of ethyl cellulose employed, that used for the hard, or heat-resistant, side of the film may be entirely unplasticized. The soft side of the film, however, is always plasticized to effect the required lowering of softening point to provide the desired thermally cementitious characteristics.

Among the plasticizers which may be used for the purpose are all of the usual softening plasticizers for ethyl cellulose, preferably of the "solvent plasticizer" type. Mixtures of plasticizers may be used to give a more decided softening effect than is obtainable from reasonable amounts of single plasticizers. Furthermore, plasticizers of the hardening type, i. e. those which aid the flow characteristics at slightly elevated temperatures without detracting from the superficial scratch hardness of ethyl cellulose at room temperature, may be used, particularly when coupled with others of the softening type. The seemingly innumerable plasticizers which may be used include, for example, tricresyl phosphate, mono-phenyl di-ortho-xenyl phosphate, dibutyl phthalate, castor oil, and like common softening plasticizers, as well as di-(tertiary-butyl-phenyl) mono-(5-tertiary-butyl-2-xenyl) phosphate, cyclohexyl p-toluene sulphonamide, o- and p-toluene sulphonamides, toluene sulphonamide-formaldehyde condensates, polychlorinated diphenyl, and the like "hardening" plasticizers, to name but a few of each type.

Compositions of the type described above, and within the recited ranges of proportion, when formed into two-sided films, can be simultaneously embossed by means of a heated matrix to impress a sound track thereon, and caused to adhere to paper, pasteboard, or other record base, when operating at temperatures of from 150° to 250° F. and at pressures of from 1000 to 3000 pounds per square inch, and preferably at 200° F. and 1500 to 2500 pounds per square inch.

The following examples illustrate the practice of the invention, but are not to be construed as limiting:

*Example 1*

A composite film, having a hard, heat-resistant side and a relatively soft, thermally cementitious side was prepared as follows:

A 25 per cent solution by weight of ethyl cellulose of 46 per cent ethoxy content and of the 60 centipoise type was formed in a solvent consisting of 80 parts of benzene and 20 parts of methanol, by volume. A film, having a thickness when dry of 0.0045 inch, was cast from the said solution of unplasticized ethyl cellulose on a moving metal belt, using the so-called extrusion casting method. Before the so-deposited film had dried, there was deposited thereover a plasticized film from solution in the same solvent, of 50 per cent of the same type of ethyl cellulose, 35 per cent of mono-phenyl di-ortho-xenyl phosphate, and 15 per cent of di-(tertiary-butyl-phenyl) mono-(5-tertiary-butyl-2-xenyl) phosphate. The composite film was freed from the benzene-methanol mixture. The total film thickness was 0.005 inch. The unplasticized surface of the film was coated with a very thin, invisible coating of sodium lauryl sulphate, deposited from 2 per cent aqueous solution thereof, to prevent the film from sticking to the die when impressed as described below. The unplasticized surface of the unitary film had a softening point of about 365° F., while the plasticized surface had a softening point of about 180°–190° F.

The two-sided film whose production was just described was cut to the size of some pre-formed pasteboard record bases. The films and base were assembled with the thermally cementitious side of the film turned toward the pasteboard, and the assembly was simultaneously embossed and sealed by applying to the exposed, hard surface of the film a heated record matrix at 200° F. and 1000 pounds pressure per square inch. After the forming die, or matrix, was lifted from the embossed record, the film was found to be uniformly and firmly united to the pasteboard base, and the impressed sound groove was a true reproduction of the original. The sound track remained unaffected by climatic changes, and even on long standing retained its fidelity to the original and exhibited good wearing qualities under the demands of heavy service.

*Example 2*

In a manner similar to that described in Example 1, there was formed a two-sided film whereof the hard side consisted of unplasticized ethyl cellulose of 48.5 per cent ethoxyl content, and of the 20 centipoise type. The thermally cementitious side of the film consisted of 70 per cent of the same ethyl cellulose, 20 per cent of cyclohexyl-p-toluene sulphonamide, and 10 per cent of dibutyl phthalate. The film thickness was 0.0045 inch. The hard side had a softening point of 270° F. and the thermally cementitious side 180°–190° F. Records were made by die impression of heated matrices on the exposed hard surface of such films, while the films were being bonded to fibrous and to thin metallic bases, as previously described. The records so obtained were faithful reproductions of the original, and were economically feasible articles for sale through the low price market channels.

It has been found that, when the supporting base has been printed prior to the coating operation herein described, most two-sided films heretofore available exhibit negligible adherence to the ink-bearing portions of the base. When, however, the films herein described are employed, there is uniform adherence with both the printed and unprinted portions of the base employed. Another disadvantage of prior films which has been overcome by the present invention is that of tending to adhere to the heated die or matrix during the die-impressing operation whereby the sound track is recorded on the surface film. If, as described in Example 1, the outer surface of the present two-sided films is coated with a layer of a sodium higher alkyl sulphate, there is no further tendency for the film to stick to the die. This layer need only be of very minute thickness, and it has been found that satisfactory coatings of sodium lauryl sulphate for the purpose may be deposited from 2 per cent solutions of the sulphate in water.

The term "organo-soluble cellulose ether" employed in the foregoing specification and in the following claims relates to a cellulose ether which dissolves to form clear solutions in volatile organic solvents and which by the same token is insoluble in water.

Other modes of applying the principle of the invention may be employed instead of those explained, change being made as regards the process herein disclosed, provided the means stated or the article recited by any of the following claims or the equivalent of such stated means or article be employed or obtained.

I therefore particularly point out and distinctly claim as my invention:

1. A sound record having a supporting base and a laminated surface film bonded thereto, said surface film being a unitary body comprised of (1) a relatively hard outer surface consisting essentially of an organo-soluble ethyl cellulose composition containing at least 80 per cent of ethyl cellulose of from 43 to 47 per cent ethoxy content, any balance of the composition not to exceed 20 per cent thereof, being a plasticizer therefor, and (2) a relatively soft, thermally cementitious inner surface in contact with the said supporting base, and made of an organo-soluble ethyl cellulose composition consisting essentially of from 65 to 40 per cent of the same type of ethyl cellulose as is present in the said outer surface composition and correspondingly from 35 to 60 per cent of a plasticizer therefor, the said hard side having a softening point at least 50 Fahrenheit degrees higher than said cementitious side.

2. A sound record having a supporting base and a laminated surface film bonded thereto, said surface film being a unitary body comprised of (1) a relatively hard outer surface consisting essentially of an organo-soluble ethyl cellulose composition containing at least 80 per cent of ethyl cellulose of from 43 to 47 per cent ethoxy content, any balance of the composition, not to exceed 20 per cent thereof, being a plasticizer therefor, and (2) a relatively soft, thermally cementious inner surface in contact with the said supporting base, and made of an organo-soluble ethyl cellulose composition consisting essentially of from 55 to 45 per cent of the same type of ethyl cellulose as is present in the said outer surface composition and correspondingly from 45 to 55 per cent of a plasticizer therefor, the said hard side having a softening point at least 50 Fahrenheit degrees higher than said cementitious side.

3. A sound record having a supporting base and a laminated surface film bonded thereto, said surface film being a unitary body comprised of (1) a relatively hard outer surface consisting essentially of an organo-soluble ethyl cellulose of from 43 to 47 per cent ethoxy content, and (2) a relatively soft, thermally cementitious inner surface in contact with the said supporting base, and consisting essentially of an organo-soluble ethyl cellulose composition consisting essentially of from 55 to 45 per cent of the same type of ethyl cellulose as is present in the outer surface composition and correspondingly from 45 to 55 per cent of a plasticizer therefor, the said hard side having a softening point at least 50 Fahrenheit degrees higher than said cementitious side.

4. A sound record having a supporting base and a laminated surface film bonded thereto, said surface film being a unitary body comprised of (1) a relatively hard outer surface consisting essentially of an organo-soluble ethyl cellulose composition containing at least 90 per cent of ethyl cellulose of from 47.5 to 49 per cent ethoxy content, any balance, not to exceed 10 per cent of the composition, being a plasticizer therefor, and (2) a relatively soft, thermally cementitious inner surface in contact with the said supporting base and made of an organo-soluble ethyl cellulose composition consisting essentially of from 85 to 50 per cent of the same type of ethyl cellulose as is present in the outer composition and correspondingly from 15 to 50 per cent of a plasticizer therefor, the said hard side having a softening point at least 50 Fahrenheit degrees higher than said cementitious side.

5. A sound record having a supporting base and a laminated surface film bonded thereto, said surface film being a unitary body comprised of (1) a relatively hard outer surface consisting essentially of an organo-soluble ethyl cellulose composition containing at least 90 per cent of ethyl cellulose of from 47.5 to 49 per cent ethoxy content, any balance, not to exceed 10 per cent of the composition, being a plasticizer therefor, and (2) a relatively soft, thermally cementitious inner surface in contact with the said supporting base and made of an organo-soluble ethyl cellulose composition consisting essentially of from 85 to 70 per cent of the same type of ethyl cellulose as is present in the outer composition and correspondingly from 15 to 30 per cent of a plasticizer therefor, the said hard side having a softening point at least 50 Fahrenheit degrees higher than said cementitious side.

6. A sound record having a supporting base and a laminated surface film bonded thereto, said surface film being a unitary body comprised of (1) a relatively hard outer surface consisting of an organo-soluble ethyl cellulose of from 47.5 to 49 per cent ethoxy content, and (2) a relatively soft thermally cementitious inner surface in contact with the said supporting base and made of an organo-soluble ethyl cellulose composition consisting essentially of from 85 to 70 per cent of the same type of ethyl cellulose as is present in the outer composition and correspondingly from 15 to 30 per cent of a plasticizer therefor, the said hard side having a softening point at least 50 Fahrenheit degrees higher than said cementitious side.

7. A sound record having a supporting base and a laminated surface film bonded thereto, said surface film being a unitary body comprised of (1) a hard outer layer adapted to have impressed thereon a sound track and consisting essentially of an organo-soluble ethyl cellulose and a plasticizer and (2) a thermally cementitious inner layer, softer than the outer layer, in contact with said supporting base consisting essentially of the same organo-soluble ethyl cellulose, and a plasticizer in greater proportion than in the hard layer, said inner layer being adapted to soften and adhere tenaciously to said supporting base at a temperature at least 50° F. below the softening point of said outer layer.

WILLIAM R. COLLINGS.